UNITED STATES PATENT OFFICE 2,570,867

METHOD OF CRYSTAL FORMATION AND PRECIPITATION

Vincent J. Schaefer, Schenectady, N. Y., assignor to General Electric Company, a corporation of New York No Drawing. Application January 21, 1948, Serial No. 3,545

3 Claims. (Cl. 299—28)

This application is a continuation-in-part of my copending but now abandoned earlier application, Serial No. 725,155, filed January 29, 1947, and assigned to the same assignee as the present invention.

The present invention comprises a process whereby crystallization is caused in supersaturated vapor-containing gases and aerosols of supercooled liquid droplets. It relates in particular to the development of ice crystals in aerosols comprising supercooled water droplets as, for example, supercooled natural atmospheric clouds in which snow crystals do not form even though the clouds have assumed a temperature below 0° C. and even as low as −35° C. or −38° C.

In accordance with my invention, minute crystals or nuclei are caused to be formed in such media by reducing the temperature in localized spheres or regions below the temperature at which supercooled liquids can exist, namely, below −35° C., more particularly, in the case of water, −39° C.

Ice crystal formation in a supercooled aerosol or cloud may be initiated by seeding the cloud with particles of a substance, for example, solid carbon dioxide (which assumes a temperature under ordinary conditions of about −78° C.) whereby zones of low temperature (−35° C. or lower, for example, −39° C.) are produced at which ice crystals will be formed spontaneously. Two exemplary conditions may be distinguished to which my invention is applicable.

(a) To an aerosol or cloud of fine supercooled liquid droplets.

(b) To supersaturated vapors in a gas; for example, water vapor in atmospheric air, the air being supersaturated with water vapor with respect to ice.

In the former condition (a), in introducing Dry Ice particles (solid $CO_2$ particles) into a supercooled cloud, it is preferred, though not essential, to drop the cooling particles (for example, solid $CO_2$), at the top of the supercooled cloud using particles of such a size that they will fall through the complete vertical thickness of the supercooled region of the cloud, thus producing a vertical plane of a seeded portion of the cloud within a relatively short period of time, depending on the size of the cloud and the size of particles being dropped. For example, a particle of solid Dry Ice 1 cm. in diameter will fall approximately 4000 meters in six minutes before it completely evaporates, thus indicating the effective way in which this invention may be practiced. By this means, it is possible to produce in nature effects which are rarely if ever produced by natural causes.

For instance, ice crystals in the supercooled region of a thunder cloud normally form in the upper layers thereof far above the freezing isotherm, thus requiring considerable time for these crystals to fall into and affect the unstable supercooled region of the cloud. By means of my invention, tremendous quantities of ice crystals can be produced in the heart of this supercooled region within a much shorter period of time than is required if nature is allowed to follow its own course.

The latter condition (b) may exist adjacent to an atmospheric cloud of liquid droplets, and may extend under a cloud a distance of approximately ten meters for each degree of supercooling of the cloud, the total extent of such a layer being approximately from 100 to 300 meters. This latter fact permits the introduction of ice crystals in an atmospheric cloud by the release of, for instance, particles of solid $CO_2$ or other cooling media (for example, liquid oxygen) below the cloud in the zone of supersaturation. The resultant cooling causes the formation of ice crystals.

The process of crystallization releases sufficient heat to cause a local increase in temperature as great as 0.8° C. at the boundary between the crystals and the surrounding supercooled cloud. The increase in temperature of the surrounding air or the surrounding supercooled cloud (or other suspending medium) produces a convective movement of air which, in many instances, is much greater than that naturally present, and, therefore, the crystals formed by the seeding process are carried upward and spread through the cloud from the places where they were originally formed.

Supercooled water droplets cannot exist in this form at tempearatures below −35° C., more particularly −39° C. When, for example, pellets of solid carbon dioxide (Dry Ice) pass through a saturated air mass containing supercooled water droplets, and constituting a cloud, the air close to the pellets is cooled below this transition temperature, and produces condensation which takes the form of minute ice crystals. Myriads of such crystals are formed. I estimate their number to be of the order of at least $10^{15}$ crystals per gram of Dry Ice. When such crystals are formed in a cloud of supercooled water droplets, the latter are converted into snow crystals, which continue to grow until ordinary snow flakes are formed by the described process spreading through the supercooled cloud.

As the crystals grow, they fall as a precipitate. The smaller crystals grow larger by accretion at the expense of the surrounding vapor and droplets of supercooled liquid. Under certain conditions in the atmosphere (i. e., when the falling velocity of the crystals is essentially neutralized by the rate of rise of the convective currents in the cloud) large concentrations of such crystals develop in localized regions. When the concentration becomes so high that the crystals collide, fragmentation occurs thus producing a chain reaction effect which may lead to the development of even greater numbers of ice nuclei than those originally produced by the initial use of the solid carbon dioxide.

It will, of course, be apparent to those skilled in the art that in the case of seeding naturally occurring clouds of supercooled droplets, the type of precipitation which reaches the ground will depend on the temperature conditions existing below the cloud. Thus, warm temperatures are conducive to the formation of rain while temperatures closer to the freezing point of water are conducive to the maintenance of the originally snow-crystalline state, and thus there is obtained a fall of snow to the ground, the crystals comprising this snow being identical in configuration and lattice work to the crystals produced by nature itself.

It is also possible to initiate the formation of rain in a fairly stable cloud system wherein only the upper portion of the cloud is supercooled. Under many natural conditions, such clouds develop and disappear without any snow ever developing in the supercooled portion of the cloud. By seeding the supercooled region of the cloud with Dry Ice, it is possible to produce snow crystals which melt when they fall into the above-freezing portion of the cloud, and these droplets produced by the melting crystals grow even larger as they fall through the cloud and thus produce rain.

Cooling of regions in a volume of supercooled suspended liquid droplets may be produced by means other than the rapid sublimation of particles of a solid or liquid material of high volatility which by its rapid evaporation is capable of producing a desirable low temperature. The rapid expansion of a compressed gas into a cloud of supercooled water droplets can be employed to produce the formation of ice nuclei. For example the expansion of a gas such as liquid carbon dioxide or the sudden expansion of liquid oxygen or liquid air which has been compressed to a pressure of 20 lbs./sq. in. will result in a drop of temperature to $-35°$ C. or lower. The dispersion in the aerosol of even a small amount of air cooled to such low temperature by sudden expansion will result in crystal formation and growth in the cold supersaturated air or medium. I have effected crystal formation in a supercooled atmosphere comprising water droplets by passing a metallic element cooled (for example in the liquid air) to a temperature to at least below $-35°$ C. for example $-39°$ C., through the atmosphere.

In practicing my invention I have flown in an airplane above a strato-cumulus (supercooled) cloud formation and dropped particles of solid Dry Ice (solid $CO_2$) into the aforesaid cloud formation. As a result thereof, snow crystals in great numbers formed and a vertical groove free of either snow crystals or supercooled water droplets resulted and myriads of snow crystals fell out of the cloud. I have also obtained similar results by flying directly into the clouds and seeding the supercooled cloud with solid Dry Ice particles or by injecting liquid $CO_2$. Snow crystals have also been caused to form in naturally occurring clouds by flying in an airplane immediately below a supercooled cloud and dropping solid $CO_2$ particles so that they are carried up into the cloud by convective currents of air; the injection of liquid $CO_2$ into the atmosphere immediately below the cloud has worked similarly.

In another instance, during the summer time, rain has been produced from a naturally occurring cumulus cloud formation having a supercooled portion by dropping particles of solid $CO_2$ from an airplane into the supercooled portion. Although the initial formation comprises huge quantities of snow crystals, as these crystals fell out of the sky the warm air below the cloud converted the snow crystals to rain.

In another instance, I have converted a supercooled ground fog into ice crystals by introducing nuclei of solid $CO_2$ or liquid $CO_2$ into the said fog. These procedures can either dissipate the fog entirely or make the fog more stable depending upon the number of ice nuclei resulting from the cooling effect produced by the Dry Ice. Increased numbers of Dry Ice particles lead to increased numbers of ice nuclei.

In a similar manner sublimation or precipitation in a crystalline solid state can be initiated in other supersaturated vapors or supercooled clouds of materials other than water. For example, I have found it possible thus to precipitate benzene in crystalline form by seeding a medium containing supersaturated or supercooled vapors of the said benzene in a non-chrystalline state.

In a copending application, Serial No. 3,544, now Patent No. 2,527,230 of October 24, 1950, filed concurrently herewith by me and Bernard Vonnegut, the said application being a continuation-in-part of our earlier but now abandoned application Serial No. 725,156, filed January 29, 1947, are described other means whereby crystallization in supercooled aerosols may be caused to take place. Included in such means is the introduction of foreign crystallization nuclei. For example, ice crystals may be formed in supercooled clouds of water vapor by the broadcast seeding in such clouds of minute crystals of foreign crystalline substances which may have a hemimorphic hexagonal crystal structure similar to that of ice. In particular silver iodide and wurtzite (ZnS) have been found to be efficient. Various natural minerals in a finely divided state may be similarly employed to initiate crystallization in supercooled aerosols of water; namely, zincite (ZnO), nephelite ($NaAlSiO_4$) and apatite [$Ca(FCl)Ca_4(PO_4)_3$]. Lead iodide also may be used.

By the practice of my invention, it has been found possible to disperse and precipitate supercooled clouds. For example, dangerous icing conditions adjacent airports and airplane routes can be in many cases satisfactorily removed. In addition, weather conditions over certain areas may be controlled by seeding naturaly occurring clouds and precipitating the supercooled droplets either in the form of snow or rain depending on the temperature conditions existing below the clouds. Furthermore, territorial visibility which is obscured from the air by cloud formations may be improved by causing precipitation of the obscuring clouds in whole or in part. By means of my invention, the harmful effects of hail storms can be ameliorated or eliminated by injecting Dry Ice particles in cloud formations thus increasing the number of potential hail nuclei.

What I claim as new and desire to secure by Letters Patent of the United States is:

1. The method of causing crystal formation in a mass of supercooled water droplets suspended in air, which method comprises reducing the temperature of a part of said mass below $-35°$ C. by introducing particles of solid carbon dioxide into said mass whereby myriads of minute ice crystals are formed and resulting in the growth of said ice crystals into snow crystals.

2. The method of causing ice crystal formation in a natural atmospheric cloud which is supercooled to a temperature below $0°$ C., which method comprises dispersing particles of solid carbon dioxide in a portion of air below said cloud which is supersaturated with respect to ice thereby to cool that portion of the mass to below $-35°$ C.

3. The method of producing rain from a natural atmospheric cloud which is supercooled to a temperature below $0°$ C., and which comprises a mass of suspended supercooled water droplets over an area having a temperature at least equal to that required to melt snow crystals, which method comprises initiating ice crystal formation by introducing into said mass particles of solid carbon dioxide whereby the temperature of part of said mass is reduced to below $-39°$ C. and myriads of ice crystals are formed and are precipitated as rain upon falling into the above-freezing atmosphere underneath the said atmospheric cloud.

VINCENT J. SCHAEFER.

REFERENCES CITED

The following references are of record in the file of this patent:

UNITED STATES PATENTS

| Number | Name | Date |
|---|---|---|
| 462,795 | Gathmann | Nov. 10, 1891 |
| 1,512,783 | Miller | Oct. 21, 1924 |
| 2,068,987 | King | Jan. 26, 1937 |
| 2,160,900 | Pleasants | June 6, 1939 |
| 2,232,728 | Pleasants | Feb. 25, 1941 |

OTHER REFERENCES

Clipping from the Washington, D. C. Herald, September 13, 1934.